(12) United States Patent
Crebassol et al.

(10) Patent No.: US 11,975,848 B2
(45) Date of Patent: May 7, 2024

(54) METHOD FOR OPERATING A FROST TREATMENT SYSTEM COMBINING AT LEAST TWO HEATING MATS AND OUTER AIRCRAFT WALL COMPRISING A FROST TREATMENT SYSTEM OPERATING ACCORDING TO THIS METHOD

(71) Applicant: Airbus Operations SAS, Toulouse (FR)

(72) Inventors: Florent Crebassol, Labege (FR); Morgan Croixmarie, Blagnac (FR); Rémi Magnon, Blagnac (FR); Florent Huet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 194 days.

(21) Appl. No.: 17/693,596

(22) Filed: Mar. 14, 2022

(65) Prior Publication Data

US 2022/0297842 A1    Sep. 22, 2022

(30) Foreign Application Priority Data

Mar. 16, 2021   (FR) ....................................... 2102587

(51) Int. Cl.
*B64D 15/14*   (2006.01)
*H05B 1/02*    (2006.01)

(52) U.S. Cl.
CPC ........... *B64D 15/14* (2013.01); *H05B 1/0236* (2013.01)

(58) Field of Classification Search
CPC .............................. B64D 15/14; H05B 1/0236
See application file for complete search history.

(56) References Cited

U.S. PATENT DOCUMENTS 5,351,918 A * 10/1994 Giamati ................. B64D 15/12
                                                         244/134 R
2010/0199629 A1   8/2010 Chene et al.
(Continued)

FOREIGN PATENT DOCUMENTS

| EP | 2650219 A2 | 10/2013 |
| EP | 3594123 A1 | 1/2020 |
| GB | 1117843 A  | 6/1968 |

OTHER PUBLICATIONS

French Search Report; priority document.

*Primary Examiner* — Christopher D Hutchens
(74) *Attorney, Agent, or Firm* — Greer, Burns & Crain, Ltd.

(57) ABSTRACT

A method for operating a frost treatment system including a first heating mat, covering a first zone and an intermediate zone of a second zone, operating alternately at a first energy level adjusted to maintain a first positive temperature on the first zone and a negative temperature on at least a part of the intermediate zone and at a second energy level adjusted to generate a positive temperature on the intermediate zone, a second heating mat covering the second zone apart from the intermediate zone and ensuring the defrosting function for the zone. This solution makes it possible to reduce the energy consumption of the first heating mat by reducing the energy level at which it is powered for most of the time. Also, an outer wall of an aircraft is provided including at least one frost treatment system operating according to this method.

6 Claims, 3 Drawing Sheets

(56) References Cited

U.S. PATENT DOCUMENTS

| | | | |
|---|---|---|---|
| 2011/0297789 A1* | 12/2011 | Gallman | B64D 15/14 |
| | | | 702/176 |
| 2014/0138490 A1 | 5/2014 | Botura et al. | |
| 2015/0346122 A1* | 12/2015 | Stothers | B64D 43/00 |
| | | | 702/130 |
| 2020/0017221 A1 | 1/2020 | White | |

* cited by examiner

METHOD FOR OPERATING A FROST TREATMENT SYSTEM COMBINING AT LEAST TWO HEATING MATS AND OUTER AIRCRAFT WALL COMPRISING A FROST TREATMENT SYSTEM OPERATING ACCORDING TO THIS METHOD

CROSS-REFERENCES TO RELATED APPLICATIONS

This application claims the benefit of the French patent application No. 2102587 filed on Mar. 16, 2021, the entire disclosures of which are incorporated herein by way of reference.

FIELD OF THE INVENTION

The present application relates to a method for operating a frost treatment system combining at least two heating mats and an outer wall of an aircraft comprising at least one frost treatment system operating according to this method.

BACKGROUND OF THE INVENTION

According to an embodiment described in the document US 2010/199629, an air intake of an aircraft nacelle comprises a device of electric type for frost treatment. According to a first embodiment, the air intake comprises multiple mats 6a to 6d staggered from upstream to downstream in the direction of flow of the air in the nacelle. According to another embodiment, the air intake comprises multiple sectors 201 to 212 distributed around the circumference of the nacelle.

According to one mode of operation, each mat operates in defrosting mode, according to alternately leveled sequences, at a first energy level for a duration T0 to T3, then at a second energy level (which can be zero) during the next period T3 to T0. When the mat operates at the first energy level, this first energy level provokes:

for the duration T0 to T1, a temperature rise on the outer surface, for the duration T1 to T2, a stagnation of the temperature, solid water (frost or ice) on the outer surface changing phase and becoming liquid, for the duration T2 to T3, once again a temperature increase on the outer surface when the frost or the ice has disappeared on the outer surface.

When the mat operates at the second level, the temperature on the outer surface decreases gradually. Consequently, the presence of frost or of ice is tolerated during the period T4 to T0 and T0 to T1 of a cycle.

According to one mode of operation, the different mats distributed around the circumference, sector by sector, are successively activated and deactivated. Consequently, when the mat of one sector is not activated, this sector is subject to the formation of frost.

The modes of operation described in the document US 2010/199629 do not make it possible to obtain a permanent antifrost function on a given zone.

According to an embodiment that can be seen in FIGS. 1 to 3, an air intake of a nacelle 10 of an aircraft 12 comprises a leading edge 14 which has a surface S14 over which an air stream 16 flows from upstream to downstream. This leading edge 14 comprises a frost treatment system 18 covering first and second zones Z1 and Z2 of the surface S14, the second zone Z2 being situated downstream of the zone Z1, the first and second zones Z1, Z2 being adjacent and separated by a junction line 20. These zones Z1 and Z2 are known and imposed in the design of the nacelle, notably as a function of the characteristics of the engine incorporated in the nacelle.

According to one mode of operation, the frost treatment system 18 is configured to prevent the formation of frost on the first zone Z1 and tolerate small masses of frost or of ice on the second zone Z2 if the frost or ice are regularly detached.

The frost treatment system 18 comprises a first heating mat 21 covering the first zone Z1 to the junction line 20 and a second heating mat 22 covering the second zone Z2 from the junction line 20, offset in the downstream direction with respect to the first heating mat 21. The first and second heating mats 21, 22 can be attached to one another or be spaced apart a little at the junction line 20. As illustrated in FIGS. 2 and 3, when the first or second heating mat 21, 22 operates at a given temperature, the latter is substantially constant over almost all the surface of the heating mat 21, 22 except at the edges of the heating mat 21, 22 where the temperature exhibits a temperature gradient.

The second heating mat 22 operates in defrosting mode. Its mode of operation comprises two phases:

a first phase, visible in FIG. 2, during which the second heating mat 22 is not activated, a second phase, visible in FIG. 3, during which the second heating mat 22 is activated.

During the first phase, the temperature on the surface S14 in line with the second heating mat 22 can be negative (below zero Celsius), making the formation of at least a small mass of frost or of ice 24 possible on the second zone Z2. During the second phase, the second heating mat 22 is activated and generates, on the surface S14 in line with the second heating mat 22, a high temperature T22 provoking a sudden detachment of the small masses of frost or of ice 24 present on the second zone Z2. According to this mode of operation, the second heating mat 22 is activated for short durations, regularly spaced apart in time. As an indication, the second heating mat 22 is activated for around 10% of the time.

To prevent the formation of frost, the first heating mat 21 operates in antifrosting mode. As illustrated in FIGS. 2 and 3, the temperature on the zone Z1 must always be positive. With the second heating mat 22 not operating continually and the temperature on the zone Z2 being able to be negative, the first heating mat 21 operates continually at a high temperature T21 so that the temperature at its edge oriented toward the second heating mat 22 is positive (above zero Celsius), even if it exhibits a temperature gradient 25, in order to guarantee a positive temperature to the junction line 20.

For each of the first and second heating mats 21, 22, since the energy consumption is a function of the temperature produced, the modes of operation of the first and second heating mats 21, 22 result in high energy consumption.

The present invention aims to wholly or partly remedy the drawbacks of the prior art.

To this end, the subject of the invention is a method for operating a frost treatment system covering a surface of an aircraft over which an air stream flows from upstream to downstream in operation, the surface comprising first and second zones that are adjacent and separated by a junction line. The frost treatment system is configured to, in operation, prevent the formation of frost on the first zone and temporarily tolerate small masses of frost or of ice on the second zone, the frost treatment system comprising at least two heating mats including:

a first heating mat, covering the first zone, configured to occupy a first state during which the first heating mat is electrically powered at a first energy level so as to maintain a first positive temperature on the first zone of the surface, a second heating mat, partially covering the second zone, configured to alternately occupy an activated state ensuring a defrosting on the surface in line with the second heating mat and a deactivated state in which the second heating mat does not ensure defrosting on the surface, the second heating mat being positioned downstream of the first heating mat.

According to the invention:

the first heating mat covers an intermediate zone of the second zone, the first energy level is adjusted so as to allow the formation of frost on at least a part of the intermediate zone, the first heating mat is configured to occupy at least one second state during which the first heating mat is electrically powered at a second energy level adjusted so as to generate a positive temperature on the intermediate zone, the operating method comprising a switchover of the first heating mat from the first state to the second state just before or at the same time as a switchover of the second heating mat from the deactivated state to the activated state.

This solution makes it possible to reduce the energy consumption of the first heating mat by reducing the energy level at which it is powered for most of the time. This solution also makes it possible to reduce the sum of the instantaneous consumption of the first and second heating mats, apart from the short period during which the first heating mat is in the second state.

According to another feature, the operating method comprises:

a first period during which the first heating mat occupies the first state and the second heating mat is in the deactivated state, a second period during which the first heating mat occupies the second state and the second heating mat is in the deactivated state, a third period during which the first heating mat occupies the first state and the second heating mat is in the activated state.

According to another feature, the first heating mat is in the second state for short durations, regularly spaced apart in time.

Another subject of the invention is an outer wall of an aircraft comprising a surface over which an air stream flows from upstream to downstream in operation, the surface comprising first and second zones, the first and second zones being adjacent and separated by a junction line, the outer wall comprising at least one frost treatment system covering the surface configured to, in operation, prevent the formation of frost on the first zone and temporarily tolerate small masses of frost or of ice on the second zone.

The frost treatment system comprises at least two heating mats including a first heating mat covering the first zone, a second heating mat partially covering the second zone and positioned downstream of the first heating mat, at least one energy supply linked to the first and second heating mats and a control driving the energy supply.

According to the invention, the first heating mat covers an intermediate zone of the second zone. In addition, the control is parameterized to control the energy supply in order for the energy supply to supply:

to the first mat, alternately, during a first period, a first energy level adjusted so as to prevent a formation of frost or of ice on the first zone, during a second period, a second energy level greater than the first energy level, and to the second mat, during a third period, an energy level adjusted so as to provoke a defrosting at least on the second mat, the second mat not being powered for the remainder of the time.

According to another feature, the third period is after the second period.

According to another feature, the second and third periods have substantially the same durations.

According to another feature, the second period represents less than 25% of the sum of the first and second periods.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
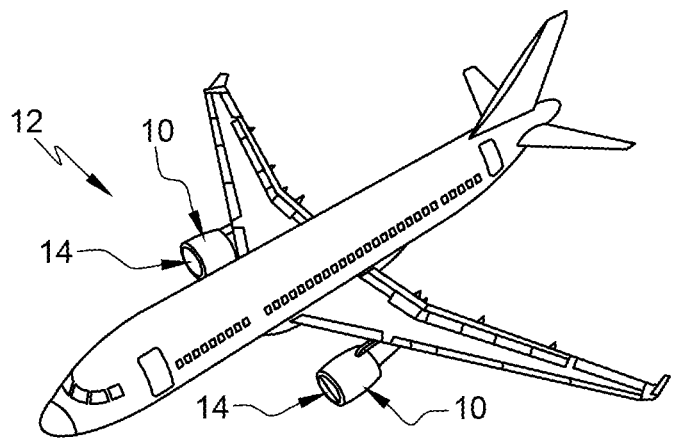
FIG. 1 is a perspective view of an aircraft.
Figure 2:
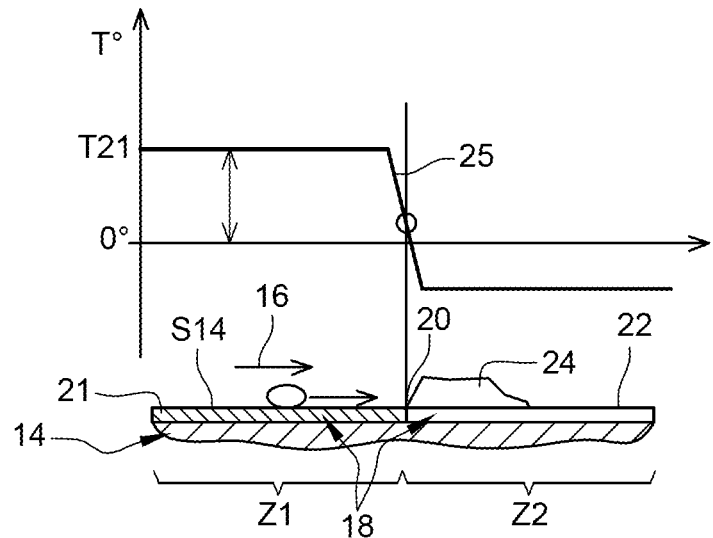
FIG. 2 is a schematic representation of a surface equipped with a frost treatment system and a curve of temperature on the surface illustrating a first phase of a mode of operation according to the prior art.
Figure 3:
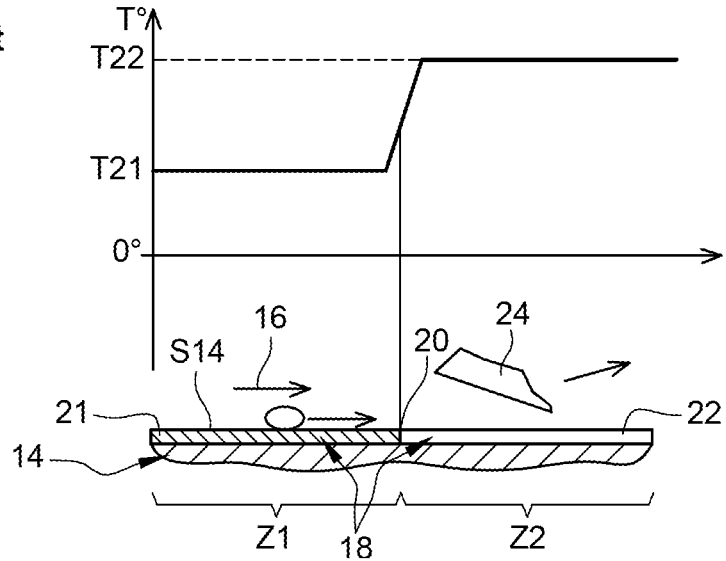
FIG. 3 is a schematic representation of a surface equipped with a frost treatment system and a curve of temperature on the surface illustrating a second phase of a mode of operation according to the prior art.
Figure 4:
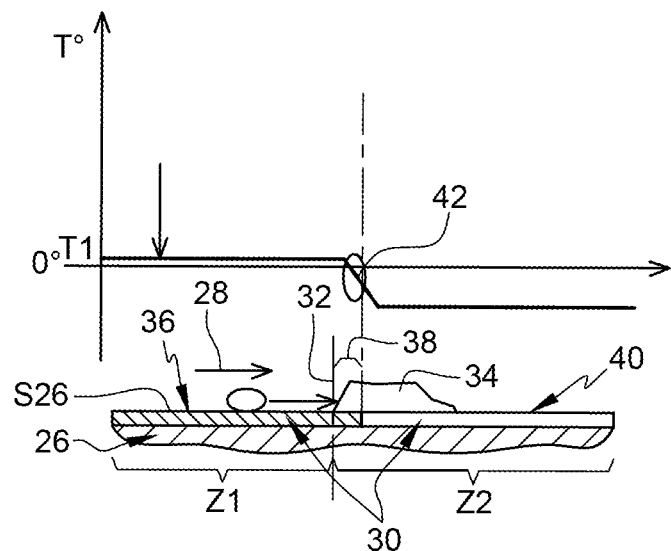
FIG. 4 is a schematic representation of a surface equipped with a frost treatment system and of a curve of temperature on the surface illustrating a first period of a mode of operation according to the invention.
Figure 5:
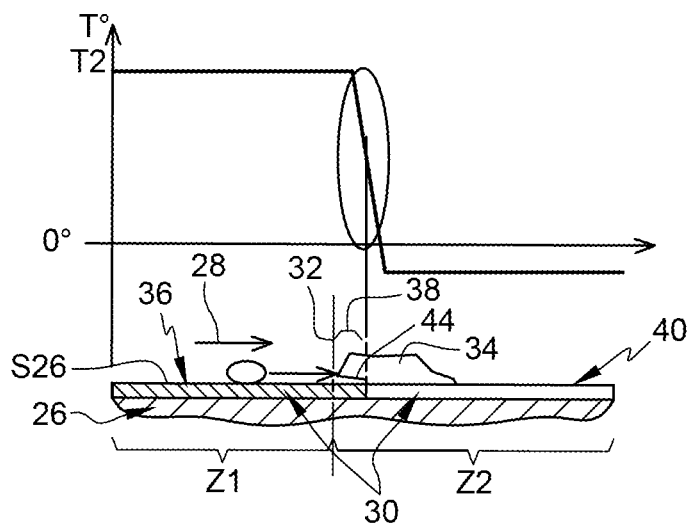
FIG. 5 is a schematic representation of a surface equipped with a frost treatment system and of a curve of temperature on the surface illustrating a second period of a mode of operation according to the invention.
Figure 6:
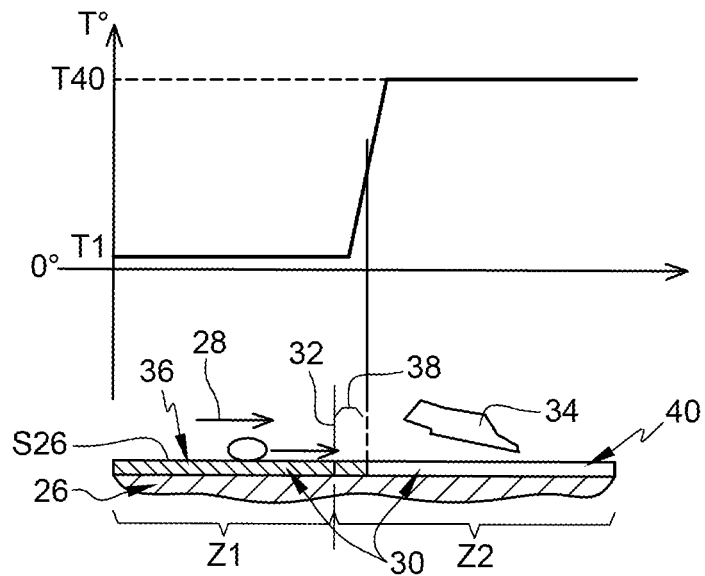
FIG. 6 is a schematic representation of a surface equipped with a frost treatment system and of a curve of temperature on the surface illustrating a third period of a mode of operation according to the invention.

In FIGS. 4 to 6, a wall 26 has a surface S26 over which an air stream 28 flows from upstream to downstream. This wall 26 comprises, on the surface S26, at least one frost treatment system 30.

According to one application, the wall 26 is an outer wall of an aircraft 12 and forms part of a leading edge, such as a leading edge of an air intake of a nacelle 10 or a leading edge of a wing for example. The invention is not limited to these applications.

This surface S26 comprises first and second zones Z1 and Z2, the second zone Z2 being situated downstream of the zone Z1, the first and second zones Z1, Z2 being adjacent and separated by a junction line 32.

The frost treatment system 30 is configured to, in operation, prevent the formation of frost on the first zone Z1 and temporarily tolerate small masses of frost or of ice 34 on the second zone Z2 if the masses of frost or of ice are regularly detached.

According to one embodiment, the frost treatment system 30 comprises at least two heating mats, a first heating mat 36 covering the first zone Z1 and an intermediate zone 38 of the second zone Z2 adjacent to the first zone Z1 and a second heating mat 40 covering the second zone Z2 apart from the intermediate zone 38, offset downstream with respect to the first electric heating mat 36, the first and second heating mats 36 and 40 being juxtaposed or spaced apart a little at the junction line 32.

Thus, the first heating mat 36 extends beyond the junction line 32 and the second heating mat 40 is spaced apart from the junction line 32.

Each of the first and second heating mats 36, 40 can comprise one or more heating mats operating in the same way.

The first and second heating mats 36, 40 each comprise an electric circuit provoking a temperature rise by Joule's effect. When the first or second heating mat 36, 40 operates at a given temperature, the latter is substantially constant over almost all of the surface of the first or second heating mat 36, 40 except at the edges of the first or second heating mat 36, 40 where the temperature exhibits a temperature gradient.

The first and second heating mats 36, 40 are not described more because they can be identical to those of the prior art.

The second heating mat 40 is configured to occupy an activated state during which the second heating mat 40 is electrically powered so as to reach, on the surface S26 in line with the second heating mat 40, a defrosting temperature T40, and a deactivated state during which the second heating mat 40 is not powered electrically and does not provoke any temperature rise on the surface S26, the latter being at a temperature which is generally negative when the aircraft is in flight in frosting conditions. In this document, a negative temperature is to be understood as being below zero degrees Celsius.

The second heating mat 40 operates in defrosting mode. Its mode of operation comprises two phases, a cold first phase, visible in FIGS. 4 and 5, during which the second heating mat 40 is in the deactivated state, and a hot second phase, visible in FIG. 6, during which the second heating mat 40 is in the activated state. During the first phase, the temperature on the surface S26 in line with the second heating mat 40 is negative, allowing the formation of at least a small mass of frost or of ice 34 on the surface S26. During the second phase, the second heating mat 40 is in the activated state and generates, on the surface S26 in line with the second heating mat 40, a high temperature T40 provoking a sudden detachment of the small masses of frost or of ice 34 present on the second zone Z2. According to the configuration that can be seen in FIG. 7, the second heating mat 40 is in the activated state for short durations D40, regularly spaced apart in time. Short is understood to mean that the second heating mat 40 is in the activated state less than 25% of the time in operation. As an indication, the second heating mat 40 is in the activated state around 10% of the time, as for the prior art. This percentage can change as a function of climatic conditions and defrosting needs.

More generally, the second heating mat 40 is configured to alternately occupy a first state ensuring a defrosting on the surface S26 in line with the second heating mat 40 and a second state in which it does not ensure defrosting on the surface S26 in line with the second heating mat 40.

According to one particular feature of the invention, the first heating mat 36 is configured to alternately occupy a first state in which the first heating mat 36 is powered electrically at a first energy level so as to maintain, on the first Z1 of the surface S26, a first positive temperature T1 and a temperature that is not necessarily positive allowing the formation of frost on the intermediate zone 38 beyond the first zone Z1, and at least one second state in which the first heating mat 36 is powered electrically at a second energy level so as to reach, on the surface S26 in line with the first heating mat 36, a second temperature T2, higher than the first temperature T1, generating a positive temperature on the surface S26 in line with the intermediate zone 38. In this document, a positive temperature is to be understood as being above zero degrees Celsius. Thus, the first energy level is adjusted so that the surface S26 has a temperature that is not necessarily positive, allowing the formation of frost on at least a part of the intermediate zone 38. The second energy level is adjusted so as to generate a positive temperature on the surface S26 over the entire intermediate zone 38.

The first heating mat 36 operates according to a mode of operation comprising at least two phases, a lukewarm first phase, visible in FIGS. 4 and 6, in which the first heating mat 36 is in the first state, and a defrosting second phase, visible in FIG. 5, in which the first heating mat 36 is in the second state. During the lukewarm first phase, the temperature on the zone Z1 is substantially equal to the positive first temperature T1 preventing the formation of frost. However, this first temperature T1 exhibits a temperature gradient 42 and is not sufficient to prevent the formation of frost or of ice on the intermediate zone 38, as illustrated in FIG. 4. During the defrosting second phase, the first heating mat 36 generates, on the surface S26 in line with the first heating mat 36, a high second temperature T2 provoking the at least partial melting of each mass of frost or of ice 34 present on the intermediate zone 38. Thus, as illustrated in FIG. 5, the interface between each mass of frost or of ice 34 and the surface S26 is broken in the intermediate zone 38. Thus, each mass of frost or of ice present only on the intermediate zone 38 is detached from the surface S26. In addition, each mass of frost or of ice 34 positioned on the intermediate zone 38 and in line with the second heating mat 40 comprises an undercut 44, upstream of the mass of frost or of ice 34, in line with the intermediate zone 38, at its interface with the surface S26, promoting the detachment of the mass of frost or of ice 34 because of the upstream to downstream flow of the air stream 28 when the second heating mat 40 is in the activated state.

Figure 7:
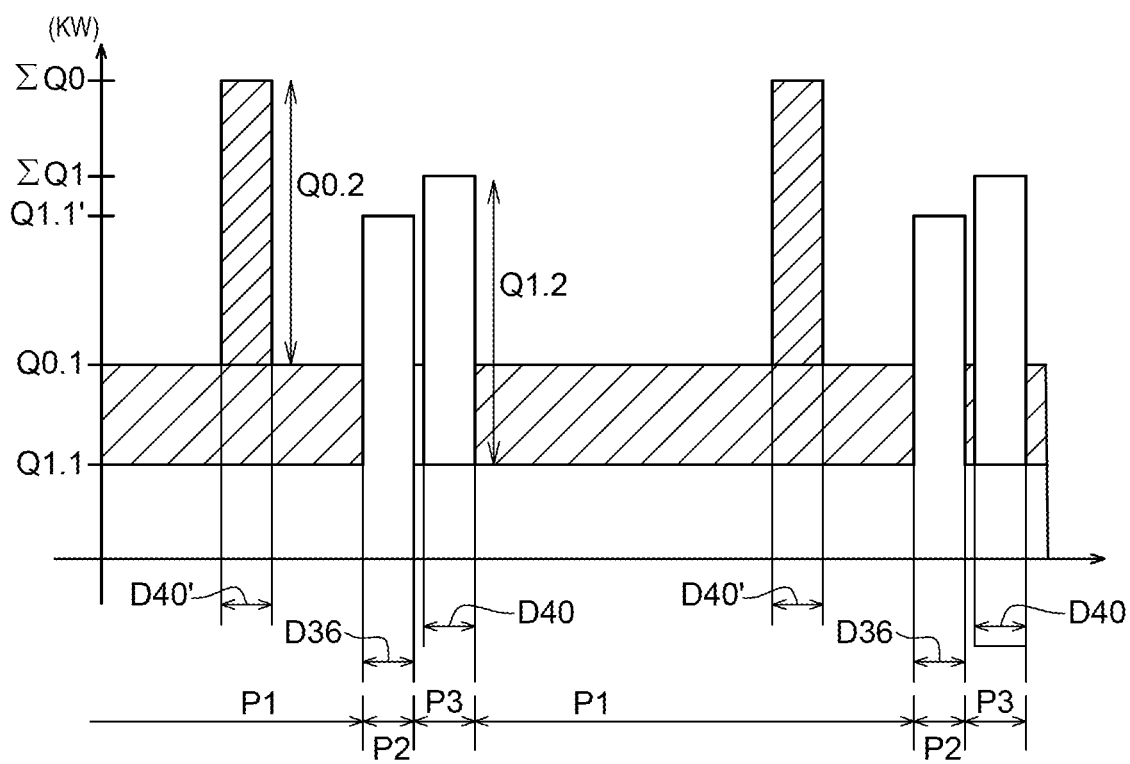
FIG. 7 is a diagram illustrating the energy consumptions of frost treatment systems operating according to the prior art and according to the invention.

According to a configuration that can be seen in FIG. 7, the first heating mat 36 is in the second state for short durations D36, regularly spaced apart in time. Short is understood to mean that the first heating mat 36 is in the second state less than 25% of the time in operation. As an indication, the first heating mat 36 is in the second state for around 10% of the time, the first heating mat 36 being in the first state outside of the durations D36. This percentage can change as a function of the climatic conditions and of the defrosting needs.

As illustrated in FIG. 7, the operating method comprises a switchover of the first heating mat 36 from the first state to the second state before a switchover of the second heating mat 40 from the deactivated state to the activated state. According to one configuration, the operating method comprises a switchover of the first heating mat 36 from the second state to the first state just before or at the same time as a switchover of the second heating mat 40 from the deactivated state to the activated state.

According to one configuration, the first heating mat 36 is kept in the second state for a duration D36 substantially equal to the duration D40 during which the second heating mat 40 is kept in the activated state.

According to a feature of the invention that can be seen in FIG. 7, the operating method of the frost treatment system 30 comprises three periods, a first period P1 during which the first heating mat 36 occupies the first state and the second heating mat 40 is in the deactivated state, as illustrated in FIG. 4, a second period P2 during which the first heating mat 36 occupies the second state and the second heating mat 40 is in the deactivated state, as illustrated in FIG. 5, and a third period P3 during which the first heating mat 36 occupies the first state and the second heating mat is in the activated state, as illustrated in FIG. 6.

Thus, during the three periods P1, P2, P3, frost does not form on the first zone Z1. During the first period P1, frost or ice can form beyond the zone Z1, notably on the intermediate zone 38. During the second period P2, the interface between each mass of frost or of ice 34 present on the intermediate zone 38 and the surface S26 is broken. During the third period P3, the masses of frost or of ice 34 present on the second zone Z2 are detached, notably on the intermediate zone 38.

Since the first heating mat 36 does not need to maintain a positive temperature to its downstream edge alongside the second heating mat 40 but only on the first zone Z1 which is away from the second heating mat 40 and from the downstream edge of the first heating mat 36, the temperature T1 is significantly lower than the temperature T21 generated by the first heating mat 21 operating according to a mode of operation of the prior art. Since the energy consumption of the heating mats is a function of the temperature that they generate, the temperature T1 being significantly lower than the temperature T21 outside of the durations D36, the energy consumption Q1.1 of the first heating mat 36 is significantly lower than the energy consumption Q0.1 of a first heating mat operating according to the mode of operation of the prior art. When the first heating mat 36 is in the second state for the short durations D36, the energy consumption Q1.1' of the first heating mat 36 is greater than the energy consumption Q0.1 of a first heating mat operating according to the mode of operation of the prior art for the same durations. However, overall, the energy consumption of the first heating mat 36 operating according to the mode of operation of the invention is lower than that of a first heating mat operating according to the mode of operation of the prior art, as illustrated in FIG. 7.

The temperature generated by the second heating mat 40 when it is in the activated state can be equal to that of a second mat in the activated state operating according to a mode of operation of the prior art. Consequently, the energy consumption Q1.2 of the second heating mat 40 for the durations D40 during which it is in the activated state is identical to the energy consumption Q0.2 of a second heating mat operating for a duration D40' according to the mode of operation of the prior art, as illustrated in FIG. 7. However, the sum of the energy consumptions $\Sigma Q1=Q1.1+Q1.2$ of the first and second heating mats 36, 40 during the third period P3 is lower than the sum of the energy consumptions $\Sigma Q0=Q0.1+Q0.2$ of the first and second heating mats 21, 22 operating according to a mode of operation of the prior art during the same period of defrosting of the zone Z2.

Whatever the embodiment, the frost treatment system comprises at least one energy power supply linked to the heating mats 36, 40 of the frost treatment system, and a controller driving the energy supply for it to transmit to each mat, during given periods P1, P2, P3, the required energy levels.

The controller is parameterized to control the power supply in order for the latter to supply:
  to the first mat 36, alternately, during a first period P1, a first energy level adjusted so as to prevent a formation of frost or of ice on the first zone Z1 and, during a second period P2, a second energy level higher than the first energy level, and
  to the second mat 40, during a third period P3, an energy level adjusted to provoke a defrosting at least on the second mat 40, the second mat 40 not being supplied for the remainder of the time.

According to one configuration, the third period P3 is after the second period P2. This third period P3 is triggered at the end of the second period P2, or just after.

The second and third periods P2 and P3 are as short as possible. Thus, the second period P2 represents less than 25% of the sum of the first and second periods P1, P2. As an indication, the second period P2 represents around 10% of the sum of the first and second periods P1, P2. The second and third periods P2, P3 have substantially the same durations.

The invention makes it possible to reduce the sum of the instantaneous energy consumptions of the first and second heating mats 36, 40, apart from the short period during which the first heating mat 36 is in the second state.

Finally, the maximum sum of the energy consumptions $\Sigma Q1=Q1.1+Q1.2$ of the first and second heating mats 36, 40 operating according to the invention is less than the maximum sum of the energy consumptions $\Sigma Q0=Q0.1+Q0.2$ of the first and second heating mats 21, 22 operating according to the prior art, it is possible to reduce the dimensioning of the energy sources needed to power the first and second heating mats 36, 40, dimensioned as a function notably according to the maximum requirements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating a frost treatment system covering a surface of an aircraft over which an air stream flows from upstream to downstream in operation,
  the surface comprising first and second zones,
    the first and second zones being adjacent and separated by a junction line,
  the frost treatment system being configured to, in operation, prevent a formation of frost on the first zone and temporarily tolerate small masses of frost or of ice on the second zone, the frost treatment system comprising at least two heating mats including
a first heating mat, covering the first zone, configured to occupy a first state in which the first heating mat is electrically powered at a first energy level so as to maintain a first positive temperature on the first zone of the surface, and
a second heating mat, partially covering the second zone, configured to occupy an activated state ensuring a defrosting on the surface in line with the second heating mat and a deactivated state in which the second heating mat does not ensure defrosting on the surface, the second heating mat being positioned downstream of the first heating mat;
wherein the first heating mat covers an intermediate zone of the second zone,
the method comprising
electrically powering the first heating mat at the first energy level adjusted to allow a formation of frost on at least a part of the intermediate zone,
electrically powering the first heating mat at a second energy level to occupy at least one second state in which the first heating mat generates a positive temperature on the intermediate zone,
switching over the first heating mat from the first state to the second state just before or at a moment of a switchover of the second heating mat from the deactivated state to the activated state,
holding the first heating mat in the first state and the second heating mat in the deactivated state for a first duration of time,
subsequently holding the first heating mat in the second state and the second heating mat in the deactivated state for a second duration of time, and
subsequently holding the first heating mat in the first state and the second heating mat in the activated state for a third duration of time,
wherein a temperature in the first zone and the intermediate zone is greater in the second state than a temperature in the first zone and the intermediate zone in the first state, and the temperature in the first zone and the intermediate zone in the first state is greater than a freezing temperature.

2. The method for operating a frost treatment system as claimed in claim 1, wherein the first heating mat is electrically operated in the second state for short durations, representing less than 25% of a time in operation of the first heating mat, spaced apart in time.

3. An outer wall of an aircraft comprising a surface over which an air stream flows from upstream to downstream in operation, said surface comprising first and second zones, the first and second zones being adjacent and separated by a junction line,
the outer wall comprising at least one frost treatment system covering the surface configured to, in operation, prevent a formation of frost on the first zone and temporarily tolerate small masses of frost or of ice on the second zone,
the frost treatment system comprising
at least two heating mats including a first heating mat covering the first zone, a second heating mat partially covering the second zone and positioned downstream of the first heating mat,
at least one energy supply linked to the first and second heating mats, and
a controller driving the energy supply;
wherein the first heating mat covers an intermediate zone of the second zone, and
wherein the controller is parameterized to control the energy supply in order for said energy supply to supply:
to the first mat, alternately, during a first period of an overall time in operation, a first energy level adjusted so as hold the first mat at a first temperature above freezing and to prevent a formation of frost or of ice on the first zone while the second mat is deactivated and, during a second period, a second energy level greater than the first energy level so as hold the first mat at a second temperature above the first temperature, and
to the second mat, during a third period, an energy level adjusted so as to increase a temperature of the second mat above freezing and to provoke a defrosting at least on the second mat while lowering the first mat from the second temperature to the first temperature, the second mat not being powered for a remainder of the time in operation.

4. The outer wall of an aircraft as claimed in claim 3, wherein the third period is after the second period.

5. The outer wall of an aircraft as claimed in claim 3, wherein the second and third periods have substantially the same durations.

6. The outer wall of an aircraft as claimed in claim 3, wherein the second period represents less than 25% of a sum of the first and second periods.

* * * * *